(12) United States Patent
Konishi (10) Patent No.: US 7,523,241 B2
(45) Date of Patent: Apr. 21, 2009

(54) HOT-PLUG SIGNAL DETECTING APPARATUS, SOURCE DEVICE AND REPEATER DEVICE

(75) Inventor: Tomohito Konishi, Neyagawa (JP)

(73) Assignee: Onkyo Corporation, Neyagawa (JP)

( * ) Notice: Subject to any disclaimer, the term of this patent is extended or adjusted under 35 U.S.C. 154(b) by 197 days.

(21) Appl. No.: 11/610,531

(22) Filed: Dec. 14, 2006

(65) Prior Publication Data

US 2007/0283071 A1 Dec. 6, 2007

(30) Foreign Application Priority Data

Jun. 6, 2006 (JP) ............................. 2006-157769

(51) Int. Cl.
*H05K 7/10* (2006.01)
*G06T 1/60* (2006.01)
(52) U.S. Cl. ................. 710/302; 348/720; 370/389; 713/310
(58) Field of Classification Search ........... 710/302; 713/310; 370/389; 348/720
See application file for complete search history.

(56) References Cited

U.S. PATENT DOCUMENTS

| 6,965,950 | B1 * | 11/2005 | Nagasawa et al. ............. 710/16 |
| 7,069,454 | B1 * | 6/2006 | Cox ............................. 713/310 |
| 7,269,673 | B2 * | 9/2007 | Kim et al. ..................... 710/72 |
| 7,283,566 | B2 * | 10/2007 | Siemens et al. ............. 370/486 |
| 2003/0214507 | A1 | 11/2003 | Mawatari et al. |
| 2005/0068346 | A1 * | 3/2005 | Ogawa et al. ............... 345/699 |
| 2005/0141851 | A1 * | 6/2005 | Nakayama et al. ............ 386/46 |
| 2005/0232030 | A1 | 10/2005 | Mawatari et al. |
| 2006/0125832 | A1 | 6/2006 | Mawatari et al. |
| 2006/0208929 | A1 * | 9/2006 | Cho ............................. 341/50 |
| 2007/0036158 | A1 * | 2/2007 | Hun-Kwon et al. ......... 370/389 |
| 2007/0165997 | A1 * | 7/2007 | Suzuki et al. ................. 386/46 |

(Continued)

FOREIGN PATENT DOCUMENTS

EP 1 706 761 12/2004

(Continued)

OTHER PUBLICATIONS

Digital Display Working Group—Digital Visual Interface DVI, Revision 1.0, Apr. 2, 1999. 76 pages.*

(Continued)

*Primary Examiner*—Mark Rinehart
*Assistant Examiner*—Brian T Misiura
(74) *Attorney, Agent, or Firm*—Renner, Otto, Boisselle & Sklar, LLP (57) ABSTRACT

There is provided a hot-plug signal detecting apparatus capable of surely detecting change of a hot plug signal without increasing load on a transmission processing unit. A hot plug signal from a sink device is inputted to an AD input terminal of a controller, the hot plug signal is subjected to AD conversion, and a high level or low level is determined from the digital value, and thus, a hot-plug detecting circuit is not necessary, which can simplify a circuit configuration. Moreover, if a period of the low level of the hot plug signal is shorter than Tout, a period of the low level is prolonged to Tout, which allows the transmission processing unit to surely detect the low level without shortening a cycle at which the hot plug signal is detected.

8 Claims, 4 Drawing Sheets

U.S. PATENT DOCUMENTS

2008/0074555 A1* 3/2008 Chen et al. .................. 348/720
2008/0152023 A1* 6/2008 Yoshida et al. .............. 375/257

FOREIGN PATENT DOCUMENTS

| JP | 2004-015104 | 1/2004 |
|----|-------------|--------|
| JP | 2005-517997 | 6/2005 |
| JP | 2006-203725 | 8/2006 |
| WO | 2005/064982 | 7/2005 |
| WO | 2006/043546 | 4/2006 |
| WO | 2006/043547 | 4/2006 |
| WO | 2006/057324 | 6/2006 |

OTHER PUBLICATIONS

High-Definition Multimedia Interface Specification Version 1.1; HDMI Licensing, LLC.

* cited by examiner

HOT-PLUG SIGNAL DETECTING APPARATUS, SOURCE DEVICE AND REPEATER DEVICE

BACKGROUND OF THE INVENTION

1. Field of the Invention

The present invention relates to a hot-plug signal detecting apparatus that detects a hot plug signal outputted from a sink device or a repeater device, and the source device and the repeater device that comprise the hot-plug signal detecting apparatus.

2. Description of the Related Art

In recent years, an AV system made of a source device that supplies contents data such as video data and audio data, and a receiving device such as a sink device and a repeater device that receives the contents data has been spread. The source device is, for example, a DVD (Digital Versatile Disk) player, BD (Blue-ray Disc) player, HDDVD (High Definition DVD) player, CD player or the like. The sink device is, for example, an LCD (Liquid Crystal Display), PDP (Plasma Display Panel), projector or the like. The repeater device is, for example, an AV amplifier, AV receiver or the like. These devices comply with HDMI standards, and are mutually connected through an HDMI cable.

To explain a case where a PDP, which is a sink device, and a DVD player, which is a source device, are connected as an example, the DVD player includes a hot-plug signal detecting apparatus that detects a hot plug signal outputted from the PDP. When a setting change (for example, stand-by, switching of a selector, disconnection of an HDMI link or the like) is notified, the PDP inverts the hot plug signal from a high level to a low level, and then again inverts it to the high level. When the hot plug signal is inverted to the low level, the DVD player executes cutting processing of the HDMI link, and when it detects the inversion to the high level, realizes the change of the setting of the PDP, acquires various pieces of information (for example, EDID or the like) from the PDP, makes setting of the HDMI, and executes necessary processing such as establishment of the HDMI link.

Figure 5:
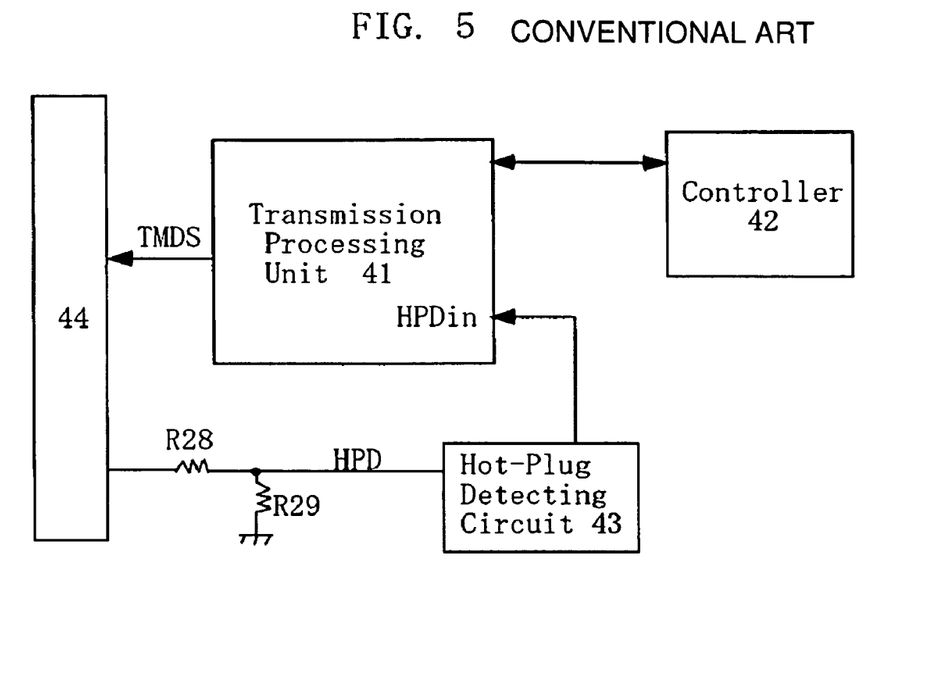
FIG. 5 is a block diagram showing a conventional hot-plug signal detecting apparatus.

FIG. 5 is a block diagram showing a conventional hot-plug signal detecting apparatus of a DVD player. A transmission processing unit 41 converts video data and audio data read from a DVD disk by a drive not shown in the figure to data compliant with an HDMI standard (hereinafter, referred to as HDMI data), and transmits it to a PDP through a TMDS channel.

Furthermore, the transmission processing unit 41 is connected to a connector 44 through a hot-plug detecting circuit 43 and resistances R28, R29. When a hot plug signal outputted from the PDP is inverted from a high level to a low level, the hot-plug detecting circuit 43 detects that the hot plug signal has been inverted to the low level, and outputs the hot plug signal of the low level to a hot-plug input terminal HPDin of the transmission processing unit 41. The transmission processing unit 41 detects that the hot plug signal has been inverted to the low level based on the hot plug signal inputted to the HPDin, and executes necessary processing.

Figure 6:
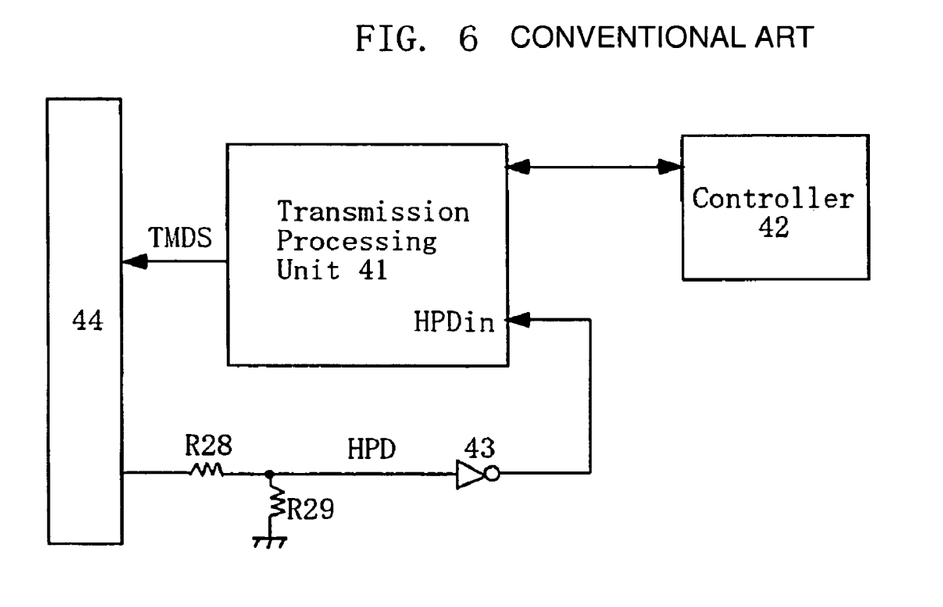
FIG. 6 is a block diagram showing a conventional hot-plug signal detecting apparatus.

The high level of the hot plug signal is 2.0 to 5.3 V, the low level is lower than 2.0 V, and these voltage values differ depending on a sink device. In the transmission processing unit 41, a predetermined binary hot plug signal of the high level or low level needs to be inputted to the hot-plug input terminal HPDin so that the high level or the lower level of the hot plug signal can be detected. Therefore, necessary is the hot-plug detecting circuit 43 that detects whether the voltage of the hot plug signal is in a high level range or in a low level range and outputs the predetermined binary hot plug signal of the high level or low level to the transmission processing unit 41, in order that the transmission processing unit 41 can detect the high level or the low level whatever voltage of the hot plug signal is outputted from the connected sink device. The hot-plug detecting circuit 43, as shown in FIG. 6, is made of an inverter circuit.

The transmission processing unit 41 is made of an MPEG chip, and needs to execute various processings such as control of the drive, decoding processing of MPEG data read from the DVD disk, and communications with a controller 42, in addition to the processing of inverting the contents data to the HDMI data. Accordingly, the parallel execution of a plurality of processings largely increases load on the transmission processing unit 41. Therefore, for the purpose of reducing the load, an interval (cycle) at which the hot plug signal inputted to the hot-plug input terminal HPDin is detected is set to be large. For example, the cycle of detection of the hot plug signal is set to 200 ms. In this case, if the sink device outputs the hot plug signal of the low level having a period of 100 ms, the transmission processing unit 41 can fail in detecting that the hot plug signal has been inverted to the low level. If the change of the hot plug signal cannot be detected, there arise problems that the operation based on the HDMI standard cannot be precisely executed, so that the contents data cannot be transmitted between the sink device and the source device, that various settings cannot be reflected, and the like. Furthermore, if the transmission processing unit 41 detects the hot plug signal with a short cycle, the above-described problems can be solved, while the problem that the load on the transmission processing unit 41 is increased is posed.

Moreover, in the case where a PDP which is a sink device and an AV amplifier which is a repeater device are connected, the AV amplifier includes a hot-plug signal detecting apparatus that detects a hot plug signal outputted from the PDP to detect the hot plug signal as described above.

SUMMARY OF THE INVENTION

An object of the present invention is to provide a hot-plug signal detecting apparatus capable of surely detecting change of a hot plug signal without increasing load on a transmission processing unit.

Another object of the present invention is to provide a hot-plug signal detecting apparatus capable of detecting a hot plug signal without providing a hot-plug detecting circuit separately.

A hot-plug signal detecting apparatus according to a preferred embodiment of the present invention comprises control section having an AD input terminal to which a hot plug signal compliant with an HDMI standard or a DVI standard from an external device is inputted, and a hot-plug output terminal for outputting a hot plug signal in response to the inputted hot plug signal, and transmission processing section that is connected to the hot-plug output terminal, has a hot-plug input terminal to which the hot plug signal from the hot-plug output terminal is inputted, and detects a high level or low level of the hot plug signal inputted to the hot-plug input terminal. The control section comprises level detecting section for converting the hot plug signal inputted to the AD input terminal to a digital value, and detecting the levels of the inputted hot plug signal by comparing the digital value with a predetermined threshold value, determination section for determining whether or not a period of one of the levels of the inputted hot plug signal is a predetermined period or more, and hot-plug signal output section for outputting the hot plug signal of the one of the levels without changing the period of the one of the levels if the period of the one of the levels of the inputted hot plug signal is the predetermined period or more, and changing the period of the one of the levels to the predetermined period and outputting the hot plug signal of the one of the levels if the period of the one of the levels of the inputted hot plug signal is less than the predetermined period.

In a preferred embodiment, voltage converting section for converting a voltage value of the hot plug signal outputted from the control section is connected between the hot-plug output terminal and the hot-plug input terminal.

In a preferred embodiment, in detecting that the hot plug signal is inverted to the one of the levels, the level detecting section determines the inversion to the one of the levels by detecting the one of the levels continuously a plurality of times.

In a preferred embodiment, the one of the levels of the hot plug signal is the low level, and the other level is the high level.

A source device and a repeater device according to preferred embodiments of the present invention each comprise the hot-plug signal detecting apparatus.

When the hot plug signal from the external device (for example, the sink device or repeater device) is inputted to the AD input terminal, the control section performs AD conversion for the hot plug signal to determine the high level or low level based on the digital value. Accordingly, although the high level or low level of the hot plug signal outputted by the external device differs depending on the external device, the high level or low level of the hot plug signal can be detected by the control section. Therefore, a conventional hot-plug detecting circuit does not need to be provided separately, which can simplify a circuit configuration. Moreover, if the period of the one of the levels (for example, low level) of the hot plug signal is shorter than the predetermined period, the period of the low level is prolonged to the predetermined period to output the hot plug signal. As a result, the transmission processing section can surely detect the low level without shortening a cycle at which the hot plug signal is detected (that is, without increasing load on the transmission processing section).

In the detection of the HDMI hot plug signal, there exists a unique problem in the hot plug signal detection that failure in detecting the inversion to the low level causes trouble in transmission and reception of contents data between the source device and the sink device (or repeater device), various setting processings and the like. However, in the present invention, since the control section prolongs the period of the low level as necessary, an outstanding effect that the above-described problem can be solved can be attained.

DESCRIPTION OF THE PREFERRED EMBODIMENTS

Hereinafter, a hot-plug signal detecting apparatus according to a preferred embodiment of the present invention is described, taking a source device 1 to which the hot-plug signal detecting apparatus is applied as an example. The present invention, however, is not limited to the embodiments.

[Configuration of AV System]

Figure 1:
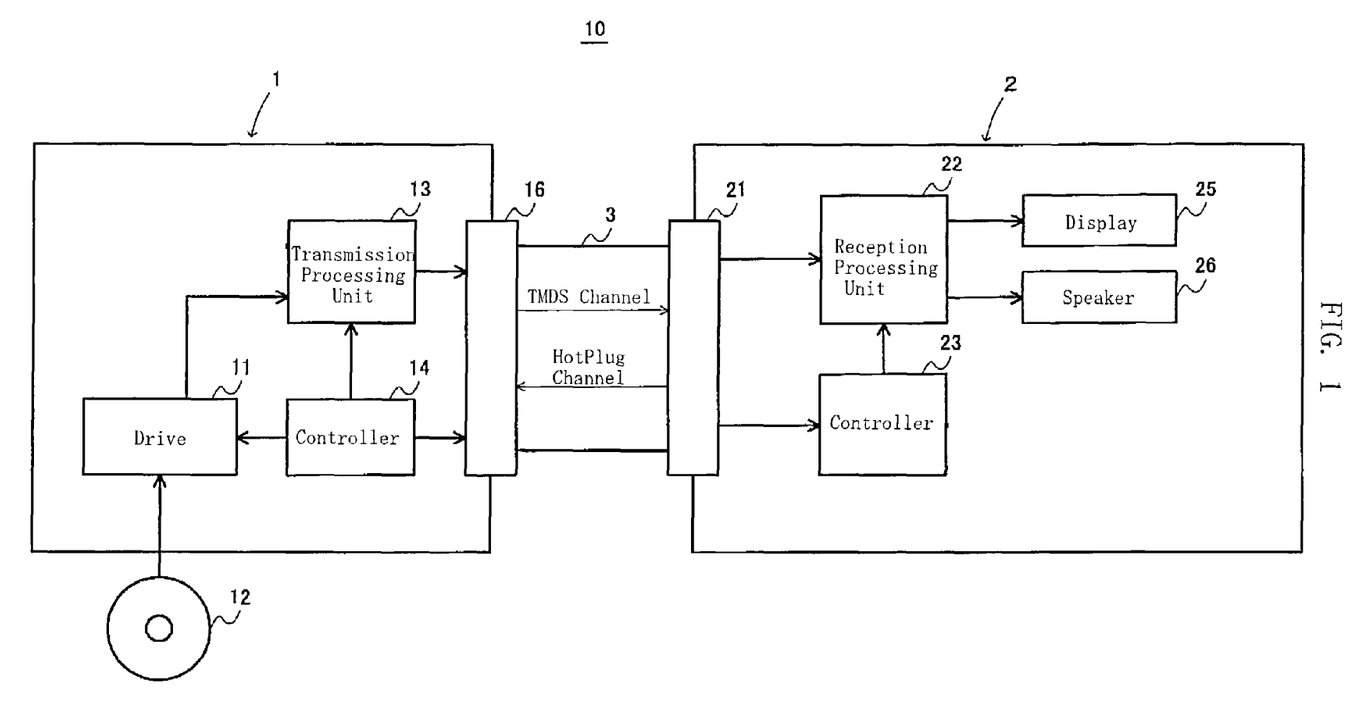
FIG. 1 is a diagram showing an AV system 10 according to a preferred embodiment of the present invention.

FIG. 1 is a schematic block diagram showing an AV system 10 including the source device 1 that supplies contents data and a sink device 2, which is a receiving device that receives the contents data. The source device 1 is, for example, a DVD player, BD player, HDDVD player, HDD player or the like. The sink device 2 is, for example, an LCD, PDP or the like. The source device 1 and the sink device 2 are devices compliant with HDMI standards.

The source device 1 and the sink device 2 are connected through an HDMI (High-Definition Multimedia Interface) cable 3 which is a digital transmission channel. The HDMI cable 3 includes two signal lines (a TMDS channel and a hot plug channel) The TMDS (Transition Minimized Differential Signaling) channel is a channel for transmitting contents data compliant with the HDMI standard from the source device 1 to the sink device 2. The hot plug channel is a channel for outputting the hot plug signal (Hot Plug Detect Signal) from the sink device 2 to the source device 1. The hot plug signal is a signal for notifying a setting change (for example, switching of a selector, cutting of an HDMI link or the like) of the sink device or the like from the sink device 2 to the source device 1. The hot plug signal is normally at a high level, and when notifying, is inverted to a low level for a predetermined period, and then inverted to the high level. The HDMI cable 3 further includes a display data channel (DDC) not shown in the figure. The DDC is a channel for the source device 1 to acquire information of the sink device 2 (EDID: Extended Display Identification Data).

[Source Device]

The source device 1 includes a drive 11, a transmission processing unit 13, a controller 14, and a connector 16. The drive 11 drives a storage medium 12 such as a DVD (Digital Versatile Disk), BD (Blue-ray Disc), HDDVD (High Definition DVD), and CD.

The transmission processing unit 13 reads out contents data from the storage medium 12 loaded on the drive 11, and converts it to data compliant with the HDMI standard (hereinafter, referred to as HDMI data). The transmission processing unit 13 further transmits the HDMI data to the sink device 2 through the TMDS channel.

The transmission processing unit 13 outputs the contents data to the TMDS channel when the hot plug signal is at the high level, and stops the output of the data to the TMDS channel when the hot plug signal is at the low level. Moreover, when the hot plug signal changes to the low level, the transmission processing unit 13 performs cutting processing of the HDMI link, and then, when it changes to the high level, the transmission processing unit 13 acquires EDID from the sink device 2 to make the setting of HDMI and establish the HDMI link.

The controller 14 controls the entire source device 1, and more particularly, controls the drive 11 and the transmission processing unit 13.

[Sink Device]

The sink device 2 includes a connector 21, a reception processing unit 22, a controller 23, a display 25, and a speaker 26.

The reception processing unit 22 generates video data from the contents data transmitted through the TMDS channel, and transmits the video data to the display 25. The reception processing unit 22 also generates audio data from the transmitted contents data, and transmits the audio data to the speaker 26.

The controller 23 controls the entire sink device 2, and more particularly, controls the reception processing unit 22, the display 25, and the speaker 26. The controller 23 further sets the hot plug signal to the low level when notifying the source device 1 of the setting change or the like.

[Hot-Plug Signal Detecting Apparatus]

Figure 2:
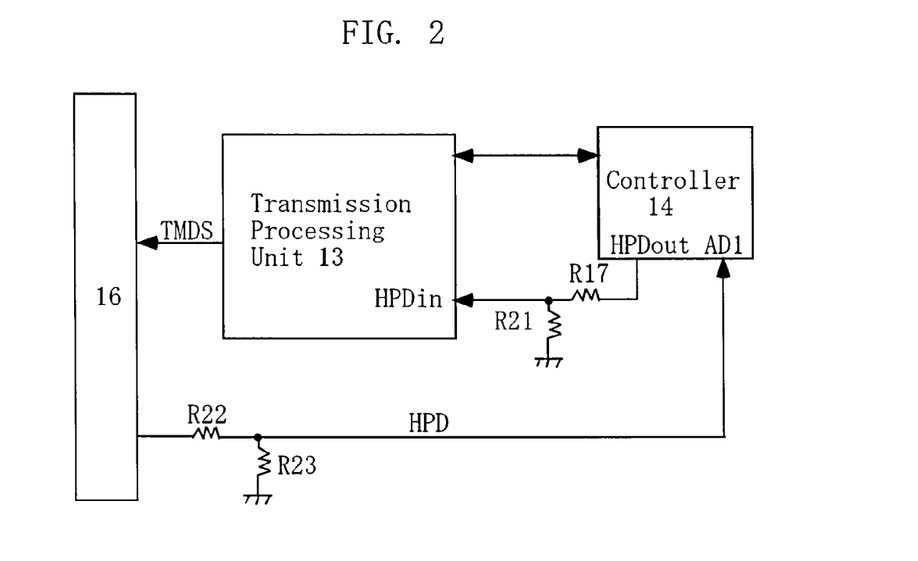
FIG. 2 is a block diagram showing a hot-plug signal detecting apparatus according to the preferred embodiment of the present invention.

FIG. 2 is a block diagram for explaining a hot-plug signal detecting apparatus in the source device 1. The hot-plug signal detecting apparatus has the transmission processing unit 13 and the controller 14. The hot-plug signal detecting apparatus further has a voltage converting unit described later as needed. The transmission processing unit 13 is typically made of an MPEG chip. The MPEG chip executes various processings such as decoding processing of the MPEG data read from the DVD disk, and communication processing with the controller 14, in addition to the conversion of the contents data to the HDMI data. The controller 14 is typically made of a system controller that controls a display unit not shown in the figure and the like.

The transmission processing unit 13 has the hot-plug input terminal HPDin to which the hot plug signal is inputted from the controller 14. The controller 14 has an AD input terminal (analog-digital conversion input terminal) AD1 to which the hot plug signal from the sink device 2 is inputted and a hot-plug output terminal HPDout that outputs the hot plug signal to the transmission processing unit 13.

To the controller 14 is inputted the hot plug signal from the sink device 2 through the AD input terminal AD1. The high level of the hot plug signal has a voltage value of 2.0 V to 5.3 V, which differs depending on the sink device 2. Similarly, the low level of the hot plug signal has a voltage value of less than 2.0 V, which differs depending on the sink device 2. Therefore, the controller 14 performs AD conversion for the hot plug signal, and determines whether the hot plug signal is at the high level or at the low level from the digital value. The controller 14, based on the determination result of the high level or the low level, converts the inputted hot plug signal to a predetermined binary hot plug signal of the high level or low level to output to the transmission processing unit 13. Furthermore, when a period of the low level of the hot plug signal is shorter than a predetermined period, the controller 14 prolongs the period of the low level to the predetermined period to output the hot plug signal.

The hot-plug output terminal HPDout is connected to the hot-plug input terminal HPDin through the voltage converting unit made of resistances R17 and R21. If the voltage values of the corresponding hot plug signals are different between the controller 14 and the transmission processing unit 13, there is caused the following problem when the hot plug signal is outputted from the controller 14 to the transmission processing unit 13. For example, if the high level of the corresponding hot plug signal of the controller 14 is 5 V and the high level of the corresponding hot plug signal of the transmission processing unit 13 is 3 V, the output of the hot plug signal of the high level (5V) by the controller 14 to the transmission processing unit 13 can damage the transmission processing unit 13 due to excess voltage because it cannot address the high level of 5 V. Therefore, by voltage dividing in the resistance R17 and the resistance R21, the high level of the hot plug signal from the controller 14 is converted to 3V, for example, to output it to the transmission processing unit 13. This can prevent the transmission processing unit 13 from being damaged due to the excess voltage.

Similarly, the AD input terminal AD1 is connected to the connector 16 through a voltage converting unit made of resistances R22 and R23. If the high level of the hot plug signal inputted from the sink device 2 and the high level of the corresponding hot plug signal of the controller 14 are different, the following problem arises when the hot plug signal is inputted to the controller 14. For example, if the high level of the corresponding hot plug signal of the controller 14 is 5 V, and the high level of the hot plug signal inputted from the sink device 2 is 5.3 V, the controller 14 can be damaged due to excess voltage when the hot plug signal of the high level (5.3 V) is inputted to the controller 14. Therefore, by voltage dividing in the resistance R22 and the resistance R23, the hot plug signal of the high level (5.3 V) from the sink device 2 is converted to 5V, for example, to be inputted to the controller 14. This can prevent the controller 14 from being damaged due to the excess voltage.

Taking into consideration the voltage division of the hot plug signal in the resistances R22, R23, a threshold value of the high level/low level detection of the controller 14 is set to a value not higher than 2×R23/(R22+R23) and as close to this value as possible because the high level is 2.0 V to 5.3 V.

[Operation of Hot-Plug Signal Detecting Apparatus]

Figure 3:
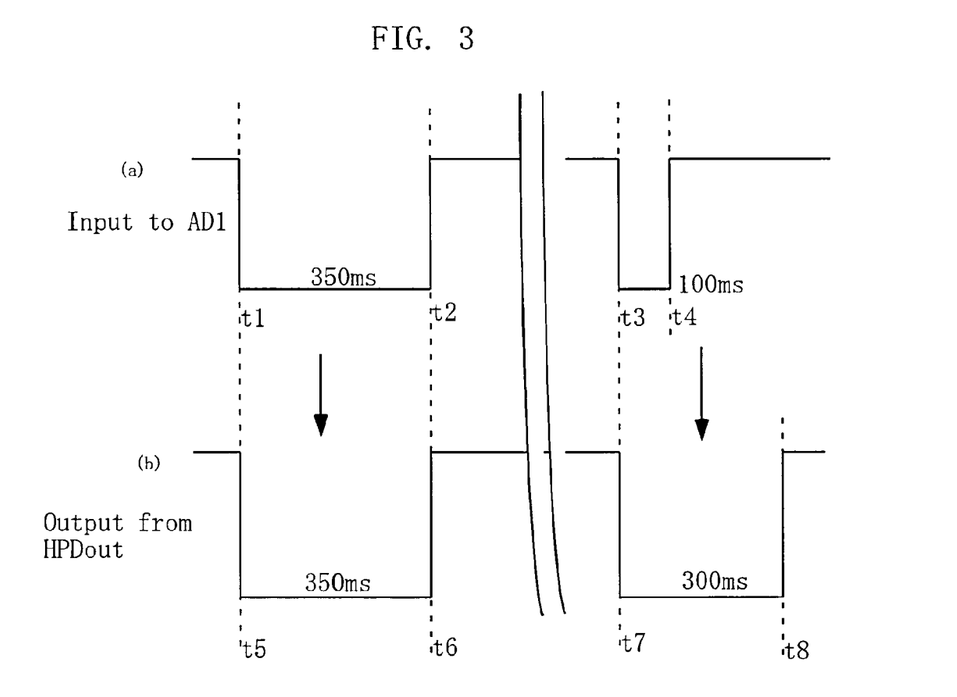
FIG. 3 is a timechart showing a hot plug signal.
Figure 4:
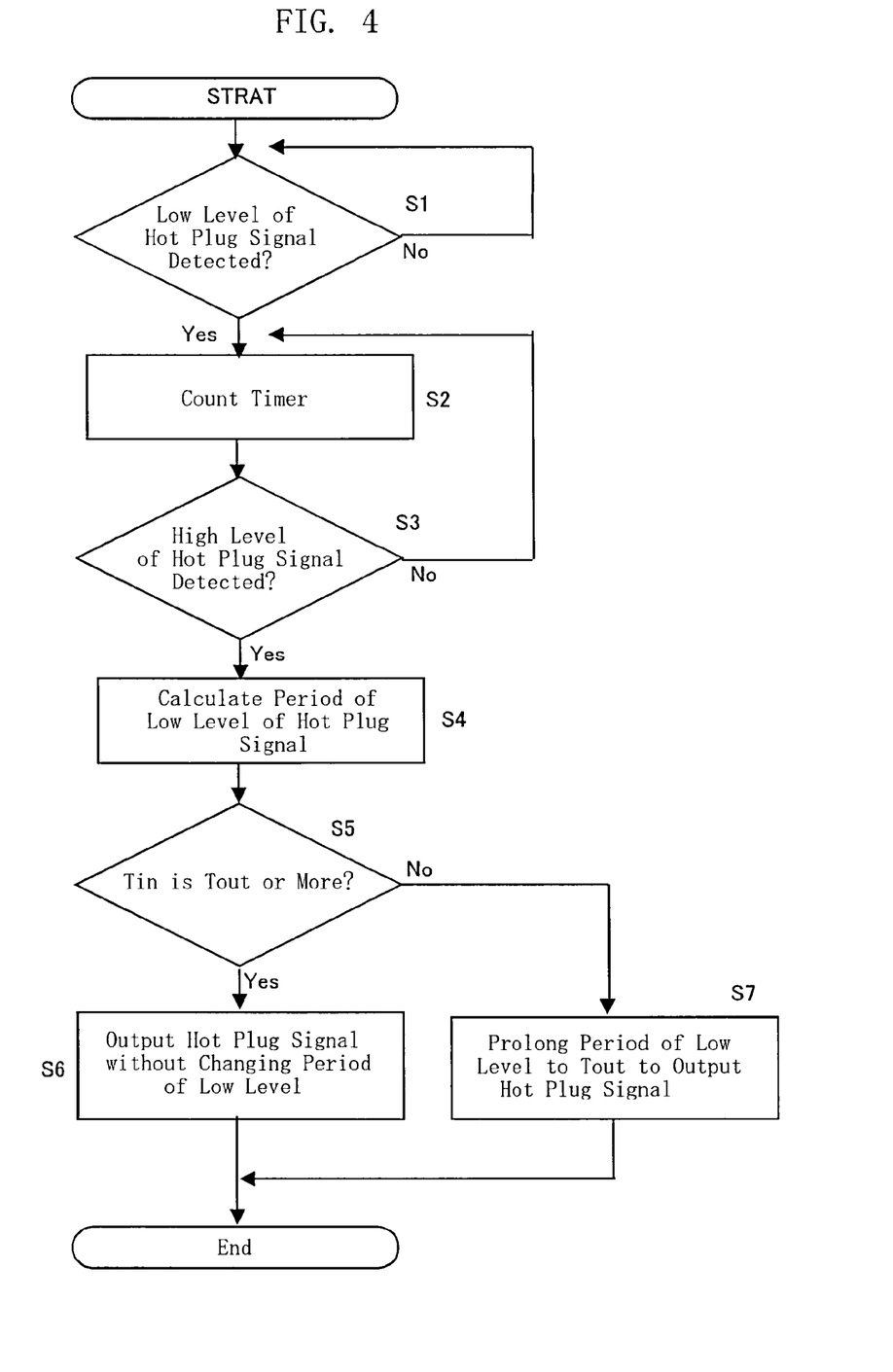
FIG. 4 is a flowchart showing operation of a controller.

The operation of the hot-plug signal detecting apparatus having the above-described configuration is described with reference to FIGS. 2 to 4. FIG. 3 is a time chart showing a relation between the hot plug signal inputted to the AD input terminal AD1 (FIG. 3(a)), and the hot plug signal outputted from the hot-plug output terminal HPDout (FIG. 3(b)). FIG. 4 is a flowchart showing the operation of the controller 14.

Referring to FIG. 4, the controller 14 monitors the hot plug signal inputted to the AD input terminal AD1 at predetermined intervals to determine whether or not the hot plug signal is inverted from the high level to the low level (S1). That is, when the hot plug signal is inputted to the AD input terminal AD1, the controller 14 converts the hot plug signal to a digital value, and based on whether or not the digital value is lower than the predetermined threshold value, it is determined whether or not the hot plug signal is inverted to the low level. If the value is the threshold value or more, it is determined that the hot plug signal at the high level (S1: NO), and if the value is less than the threshold value, it is determined that the hot plug signal is at the low level (S1: YES).

If the low level of the hot plug signal is detected (S1: YES), the controller 14 starts count of a built-in timer simultaneously with the inversion of the hot plug signal to the low level (times t1, t3 in FIG. 3(a)) (S2) so as to calculate the period of the low level of the hot plug signal, and continues the count of the timer until the inversion of the hot plug signal to the high level is detected (S2 via No in S3).

Subsequently, if the controller 14 detects that the hot plug signal has been inverted to the high level (S3: YES, times t2, t4 in FIG. 3(a)), the count of the timer ends, and a period Tin of the low level of the hot plug signal is calculated based on the count value of the timer (S4).

The controller 14 determines whether or not the period Tin of the low level of the hot plug signal is a minimum output pulse width Tout preset in the controller 14, or more (S5). Here, the minimum output pulse width Tout is a minimum value of the period of the low level of the hot plug signal which the controller 14 outputs from the hot-plug output terminal HPDout, and is set to a value larger than a minimum pulse width Tdmin (this value is a cycle at which the hot plug signal is detected), which is a minimum value of the period of the low level of the hot plug signal that the transmission processing unit 13 can surely detect. For example, when the minimum pulse width Tdmin is 200 ms (milliseconds, hereinafter the same), the minimum output pulse width Tout is set to 300 ms.

If the period Tin of the low level of the hot plug signal is the minimum output pulse width Tout or more (S5: YES), it is determined that the transmission processing unit 13 can detect the low level of the hot plug signal even when it is the period of the low level inputted to the AD input terminal AD1. As a result, the controller 14 outputs the hot plug signal of the low level of the same period as the period inputted to the AD input terminal AD1, from the hot plug output terminal HPDout (S6). For example, as shown in t1 to t2 in FIG. 3(*a*), when the low level of the inputted hot plug signal is 350 ms, the controller 14 outputs the hot plug signal of the low level of 350 ms, as shown in t5 to 56 in FIG. 3(*b*).

Upon input of the hot plug signal of low level of 350 ms from the hot-plug input terminal HPDin, the transmission processing unit 13 detects the hot plug signal of the low level to execute the corresponding processing.

On the other hand, if the period Tin of the low level of the hot plug signal is less than the minimum output pulse width Tout (S5: NO), the period of the low level of the hot plug signal inputted to the AD input terminal AD1 is below the minimum pulse width Tdmin that the transmission processing unit 13 can detect, and thus, it is determined that there is a possibility that the transmission processing unit 13 cannot detect the low level of the hot plug signal. As a result, the controller 14 changes the period of the low level of the hot plug signal from the period of the low level inputted to the AD input terminal AD1 to the same period as the minimum output pulse width Tout and outputs the hot plug signal of the low level from the hot-plug output terminal HPDout (S7). Since the minimum output pulse width Tout is set larger than the minimum pulse width Tdmin that the transmission processing unit 13 can detect, by prolonging the period of the low level of the hot plug signal to Tout, the transmission processing unit 13 can surely detect the low level. For example, as shown by t3 to t4 in FIG. 3(*a*), when the low level of the inputted hot plug signal is 100 ms, the controller 14 outputs the hot plug signal of the low level of 300 ms as shown by t7 to t8 in FIG. 3(*b*).

Although the period of the low level of the hot plug signal set by the sink device 2 is shorter than the period that the transmission processing unit 13 can detect, the transmission processing unit 13 can detect the hot plug signal of the low level and execute the corresponding processing because the hot plug signal of the low level of 300 ms is inputted from the hot-plug input terminal HPDin.

As described above, in the present embodiment, since the hot plug signal is inputted to the AD input terminal AD1 of the controller 14 from the sink device 2, the hot plug signal is subjected to AD conversion, and the high level or low level is determined from the digital value, a conventional hot-plug detecting circuit is unnecessary, which can simplify a circuit configuration. Moreover, if the period of the low level of the hot plug signal is smaller than Tout, the period of the low level is prolonged to Tout, so that the transmission processing unit 13 can surely detect the low level without shortening the cycle at which the hot plug signal is detected.

[Another Embodiment]

The hot-plug signal detecting apparatus can be applied to not only a source device but a repeater device such as an AV amplifier and an AV receiver. In this case, the repeater device is connected to the sink device, and detects the hot plug signal outputted by the sink device by using the above-described hot-plug signal detecting apparatus. Moreover, the source device may be connected to the repeater device to detect the hot plug signal outputted by the repeater device by using the above-described hot-plug signal detecting apparatus. Furthermore, the present invention may be applied to a hot-plug signal detecting apparatus that detects a hot plug signal compliant with not only the HDMI standard but a DVI (Digital Visual Interface) standard. However, since the configuration and the operation are similar to the foregoing, its description is incorporated in the foregoing.

In S1 of FIG. 4, the detection of the inversion to the low level of the hot plug signal in the controller 14 may be adapted such that by detecting the low level continuously a plurality of times (for example, twice), the inversion of the hot plug signal to the low level has been detected, and the processing goes to S2. In this case, chattering of the hot plug signal (instantaneously repeating the low level and the high level) can be prevented from being mistaken for complete inversion to the low level. That is, if the chattering is mistaken for complete inversion to the low level of the hot plug signal, the controller 14 prolongs the period of the low level to Tout to output it to the transmission processing unit 13, which can cause malfunction in the transmission processing unit 13. In this embodiment, such a problem can be solved.

While as described above, the preferred embodiments of the present invention are described, the present invention is not limited to these embodiments. For example, when the high level of the corresponding hot plug signal of the controller 14 is 3V, and the high level of the corresponding hot plug signal of the transmission processing unit 13 is 5V, the transmission processing unit 13 can mistake the high level for the low level. Therefore, by converting the voltage value of the hot plug signal from the controller 14 to a higher value in the voltage converting unit, the above-described problem can be solved. The voltage converting unit connected to the AD input terminal AD1 is similar. There may be provided a form of a program for making a computer execute the operation of the hot-plug signal detecting apparatus of this embodiment, and a recording medium on which this program is recorded, or a form of a hot-plug signal detecting method.

The present invention can be preferably employed particularly for a source device such as a DVD player or a repeater device such as an AV amplifier, which are compliant with the HDMI standard.

What is claimed is:

1. A hot-plug signal detecting apparatus, comprising:
   a control section having an AD input terminal to which a hot plug signal compliant with an HDMI standard or a DVI standard from an external device is inputted, and a hot-plug output terminal for outputting a hot plug signal in response to the inputted hot plug signal; and
   a transmission processing section that is connected to the hot-plug output terminal, has a hot-plug input terminal to which the hot plug signal from the hot-plug output terminal is inputted, and detects a high level or low level of the hot plug signal inputted to the hot-plug input terminal,
   wherein the control section comprises:
   a level detecting section for converting the hot plug signal inputted to the AD input terminal to a digital value, and detecting the levels of the inputted hot plug signal by comparing the digital value with a predetermined threshold value;

a determination section for determining whether or not a period of one of the levels of the inputted hot plug signal is a predetermined period or more; and a hot-plug signal output section for outputting the hot plug signal of the one of the levels without changing the period of the one of the levels if the period of the one of the levels of the inputted hot plug signal is the predetermined period or more, and changing the period of the one of the levels to the predetermined period and outputting the hot plug signal of the one of the levels if the period of the one of the levels of the inputted hot plug signal is less than the predetermined period.

2. The hot-plug signal detecting apparatus according to claim 1, wherein a voltage converting section for converting a voltage value of the hot plug signal outputted from the control section is connected between the hot-plug output terminal and the hot-plug input terminal.

3. The hot-plug signal detecting apparatus according to claim 1, wherein in detecting that the hot plug signal is inverted to the one of the levels, the level detecting section determines the inversion to the one of the levels by detecting the one of the levels continuously a plurality of times.

4. The hot-plug signal detecting apparatus according to claim 1, wherein the one of the levels of the hot plug signal is the low level, and the other level is the high level.

5. A source device comprising the hot-plug signal detecting apparatus according to claim 1.

6. A repeater device comprising the hot-plug signal detecting apparatus according to claim 1.

7. A hot-plug signal detecting apparatus, comprising:

a control section having an AD input terminal to which a hot plug signal compliant with an HDMI standard or a DVI standard from an external device is inputted, and a hot-plug output terminal for outputting a hot plug signal in response to the inputted hot plug signal; and a transmission processing section that is connected to the hot-plug output terminal, has a hot-plug input terminal to which the hot plug signal from the hot-plug output terminal is inputted, and detects a high level or low level of the hot plug signal inputted to the hot-plug input terminal, wherein the control section comprises:

a level detecting section for converting the hot plug signal inputted to the AD input terminal to a digital value, and detecting the levels of the inputted hot plug signal by comparing the digital value with a predetermined threshold value; and a hot-plug signal output section for outputting the hot plug signal of one of the levels to the transmission processing section when the level detecting section detects the one of the levels.

8. A hot-plug signal detecting apparatus, comprising:

a control section having an input terminal to which a hot plug signal compliant with an HDMI standard or a DVI standard from an external device is inputted, and a hot-plug output terminal for outputting a hot plug signal in response to the inputted hot plug signal; and a transmission processing section that is connected to the hot-plug output terminal, has a hot-plug input terminal to which the hot plug signal from the hot-plug output terminal is inputted, and detects a high level or low level of the hot plug signal inputted to the hot-plug input terminal, wherein the control section comprises:

a level detecting section for detecting the levels of the hot plug signal inputted to the input terminal;

a determination section for determining whether or not a period of one of the levels of the inputted hot plug signal is a predetermined period or more; and a hot-plug signal output section for outputting the hot plug signal of the one of the levels without changing the period of the one of the levels if the period of the one of the levels of the inputted hot plug signal is the predetermined period or more, and changing the period of the one of the levels to the predetermined period and outputting the hot plug signal of the one of the levels if the period of the one of the levels of the inputted hot plug signal is less than the predetermined period.

* * * * *